United States Patent
Tanimoto

(10) Patent No.: US 7,616,652 B2
(45) Date of Patent: Nov. 10, 2009

(54) FACSIMILE MACHINE

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 867 days.

(21) Appl. No.: 11/216,342

(22) Filed: Aug. 31, 2005

(65) Prior Publication Data

US 2006/0056387 A1      Mar. 16, 2006

(30) Foreign Application Priority Data

Sep. 13, 2004    (JP)    ............................. 2004-264790

(51) Int. Cl.
*H04L 12/28*    (2006.01)
*H04L 12/56*    (2006.01)
*H04N 1/60*     (2006.01)
*G06F 15/173*   (2006.01)

(52) U.S. Cl. ....................... 370/419; 370/255; 370/351; 709/223

(58) Field of Classification Search ......... 370/255–351, 370/389–392, 419–465; 358/1.9, 402–407, 358/435–444; 709/203–206, 223–227
See application file for complete search history.

(56) References Cited

U.S. PATENT DOCUMENTS

| 6,223,292 | B1* | 4/2001 | Dean et al. .................... 726/28 |
| 6,259,538 | B1* | 7/2001 | Amit et al. ................... 358/442 |
| 6,563,599 | B1* | 5/2003 | Whitfield .................... 358/1.15 |
| 6,785,018 | B2* | 8/2004 | Wakabayashi ............. 358/1.15 |
| 7,057,755 | B2* | 6/2006 | Yoshida ..................... 358/1.15 |
| 7,148,982 | B2* | 12/2006 | Terao ........................ 358/1.15 |
| 7,181,514 | B2* | 2/2007 | Saito .......................... 709/223 |
| 7,268,921 | B2* | 9/2007 | Eguchi et al. ............... 358/402 |
| 7,283,270 | B2* | 10/2007 | Boire-Lavigne et al. ... 358/1.15 |
| 2003/0133450 | A1* | 7/2003 | Baum ......................... 370/389 |
| 2004/0073076 | A1 | 4/2004 | Eguchi et al. |
| 2004/0073706 | A1* | 4/2004 | Eguchi et al. ............... 709/245 |
| 2005/0152287 | A1* | 7/2005 | Yokomitsu et al. .......... 370/255 |
| 2005/0180398 | A1 | 8/2005 | Deno et al. |

FOREIGN PATENT DOCUMENTS

| EP | 1 265 429 | 3/2004 |
| EP | 1 517 519 | 3/2005 |
| JP | 11-163914 | 6/1999 |
| JP | 2002-176462 | 6/2002 |
| JP | 2002-217941 | 8/2002 |

(Continued)

OTHER PUBLICATIONS

Japanese Language office action and its English language translation for corresponding Japanese application 2007-212535 lists the reference above.

*Primary Examiner*—Man Phan
(74) *Attorney, Agent, or Firm*—Hogan & Hartson LLP

(57) ABSTRACT

A facsimile machine is connected to the Internet via a router and carries out communication by using a set communication port. The facsimile machine includes a function for setting and changing the communication port to be used by the facsimile machine itself, and a function for changing a port transfer setting of the router so that a packet addressed to the set and changed communication port is transferred to the facsimile machine itself.

5 Claims, 6 Drawing Sheets

FOREIGN PATENT DOCUMENTS

| | | |
|---|---|---|
| JP | 2002-261794 | 9/2002 |
| JP | 2003-060871 | 2/2003 |
| JP | 2003-152766 | 5/2003 |
| JP | 2003273896 A | 9/2003 |
| JP | 2004-007151 | 1/2004 |
| JP | 2004-228736 | 8/2004 |
| JP | 2005-027254 | 1/2005 |
| WO | 03/030482 | 4/2003 |

* cited by examiner

| COMMUNICATION PORT | TRANSFER DESTINATION |
|---|---|
| 25 | 192.168.1.5 |
| 80 | 192.168.1.6 |
| 110 | 192.168.1.8 |
| 8000 | 192.168.1.100 |
| 2500 | 192.168.1.100 |
| 6000 | 192.168.1.100 |
| 9000 | 192.168.1.300 |
| 3500 | 192.168.1.300 |
| 6500 | 192.168.1.300 |

| IDENTIFICATION NAME | ADDRESS | USER ID | PASSWORD |
|---|---|---|---|
| ip.fax.net | ddns.server1 | user | 12345 |

| COMMUNICATION PORT | COMMUNICATION TYPE |
|---|---|
| 8000 | HTTP |
| 2500 | SMTP |
| 6000 | IP-FAX |

FACSIMILE MACHINE

BACKGROUND OF THE INVENTION

1. Field of the Invention

The present invention relates to a facsimile machine, which transmits and receives facsimile data via an Internet Protocol (IP) network by using the IP.

2. Description of Related Art

Recently, accompanying a spread of the Internet, various services using the Internet network are proposed. For example, a proposal is made on facsimile, which transmits and receives facsimile data via the Internet. Such facsimile is known Internet facsimile (hereinafter referred to as "IP-FAX").

A private network can be configured by a plurality of terminal devices including the IP-FAX. When a remote IP-FAX or the like connected to the Internet accesses directly to the IP-FAX via a router, a global IP address of the router and a port number of the IP-FAX to be accessed become necessary.

Suppose that an IP-FAX is connected to a private network, and a remote device connected to the Internet accesses directly to the IP-FAX via a router. When the remote device inputs and transmits a Uniform Resource Locator (URL) of the router and a port number of the IP-FAX on the private network, the router receives a packet. In the router, a private IP address and the port number of the IP-FAX connected to the private network are previously stored by being associated with one another. When the router transmits the received packet to an IP-FAX having an IP address associated with a destination port number of the received packet, the IP-FAX can receive the packet transmitted from the remote device connected to the Internet.

When a plurality of IP-FAX having the same default port number are connected to a private network, although each of the IP-FAX has different private IP addresses, the IP-FAX have the same port number with one another. Therefore, a remote device connected to the Internet cannot access directly to the IP-FAX via a router. Conventionally, when an IP-FAX establishes a connection to a private network, or when a port number of an IP-FAX is necessary to be changed, the port number of the IP-FAX is changed. Then, an access is made to the router from a Web browser of a Personal Computer (PC) connected to the private network, and a setting of the port number in the router is changed.

Meanwhile, a World Wide Web (WWW) server and a mail server or the like, which are connected directly to the Internet, are previously assigned with a fixed IP address that does not overlap with one another. However, such an IP address is expressed by a decimal number and difficult to be distinguished by a person. Therefore, a Domain Name System (DNS) is used. Further, the DNS system manages a domain name and a host name, which can be distinguished easily by a person, by associating with an IP address. By designating a domain name or a host name and carrying out an inquiry by using the DNS system, the domain name or the host name can be converted into an IP address. Such DNS system is utilized widely in the current Internet.

However, in such a DNS system, a host name and an IP address of each terminal device are required to be associated one with another and registered previously in a database of a DNS server. The host name and the IP address of each terminal device to be registered are required to be fixed. In a private network system adopting a dynamic IP address method where an IP address changes each time when a connection is established with a network, the DNS system is difficult to be applied.

Therefore, in the private network system adopting the dynamic IP address method, an exclusive router is used as a communication terminal device. Further, the exclusive router includes a function for registering dynamic DNS (DDNS) information, which includes at least an IP address and a host name assigned to the exclusive router, in a DNS server for a dynamic IP, each time when the exclusive router accesses to a communication network.

As described above, conventionally, a router manages a port transfer setting of an IP-FAX. When a port number to be used by the IP-FAX is changed, a maintenance work is also required to be carried out at the router. That is, there exists a drawback that time is required for changing the port number registered in the router.

That is, the IP-FAX includes various server functions such as a Hyper Text Transfer Protocol (HTTP) server function for serving as a document management server, for example, to store a received facsimile document. The server functions are accessed from a remote device. Therefore, a plurality of ports are required to be set in the IP-FAX. When carrying out a port setting, maintenance work is required to be carried out at both the IP-FAX and the router. There exists a drawback that an extremely troublesome operation is required to be carried out.

When a new system is introduced to a private network and a port setting of the new system is necessary to be prioritized, a port setting of an IP-FAX is required to be changed. In this case, a port transfer setting of a router is also required to be changed, which can be troublesome.

Meanwhile, as described above, each time when a router is connected to a communication network, DDNS information, which includes at least an IP address and a host name assigned to the router, is required to be registered in a DNS server for the dynamic IP, and an exclusive router is used. However, recently, a broadband environment has already been established. If an exclusive router for the DDNS is provided, routers become redundant and a system becomes difficult to be constructed. Therefore, a consideration is made to provide a router function in a facsimile machine. However, if the router function is provided in a facsimile machine, there exists a drawback of an increase in the costs of the facsimile machine.

SUMMARY OF THE INVENTION

The present invention has been made in consideration of the above-described circumstances. An advantage of the present invention is to provide a facsimile machine, which can easily carry out a port transfer setting, which can use a DDNS system without requiring an exclusive router, and which can simplify a system architecture and easily carry out a maintenance work.

According to a first aspect of the present invention, a facsimile machine includes a function for setting and changing a communication port to be used by the facsimile machine itself, and a function for changing a port transfer setting of a router so that a packet addressed to the set and changed communication port is transferred to the facsimile machine itself.

According to a second aspect of the present invention, the facsimile machine further includes a function for acquiring port information used by the router, and a function for notifying when the set and changed communication port is included in the acquired port information and the set and changed communication port cannot be used.

According to the first aspect, by setting and changing the communication port to be used by the facsimile machine itself, the port transfer setting of the router is changed automatically. Therefore, the port transfer setting can be carried out easily. According to the second aspect, when the communication port set and changed by the facsimile machine is included in a port used by the router and cannot be used, such a fact is notified. Therefore, an invalid port setting can be avoided easily.

According to a third aspect of the present invention, a facsimile machine includes a function for acquiring port information used by a router, a function for automatically deciding a communication port to be used by the facsimile machine itself in accordance with the acquired port information, a function for changing a port transfer setting of the router so that a packet addressed to the decided communication port is transferred to the facsimile machine itself, and a function for notifying information of the decided communication port.

According to the third aspect, a communication port to be used by the facsimile machine itself is decided automatically from the port information used by the router, and the port transfer setting of the router is changed. A port setting is not required to be carried out manually in particular, and a port setting operation can be simplified. In addition, since the decided port setting information is notified from a display unit or the like, a user can easily confirm the decided port setting.

According to a fourth aspect of the present invention, a facsimile machine includes a function for storing address information and account information of a prescribed remote server and a domain name of the facsimile machine itself, and a function for registering registration information including the domain name with the remote server device.

According to the fourth aspect, the domain name of the facsimile machine is registered automatically with the remote server device. Therefore, without requiring an exclusive router, a DDNS system can be used, and a system architecture can be simplified.

According to a fifth aspect of the present invention, the facsimile machine further includes a function for acquiring global address information of the router, and a function for clocking. When the function for acquiring acquires the global address information of the router periodically under a prescribed interval and the acquired global address information has been changed from information acquired last time, after the function for registering immediately updates the registration information, the function for clocking clocks a period of time from when the registration information is registered with the remote server. When a prescribed period of time elapses from when the registration information is registered, the registration information is updated.

According to the fifth aspect, the global address information of the router is acquired periodically under a prescribed interval. When the acquired global address information has been changed from the information acquired last time, the registration information registered in the remote server is updated immediately. The registration information is required to be updated in the DDNS server for each prescribed period of time. According to the fifth aspect of the present invention, the registration information is updated automatically after a prescribed period of time elapses from when the address information is registered with the remote server. Therefore, the maintenance of the DDNS server can be carried out easily. Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
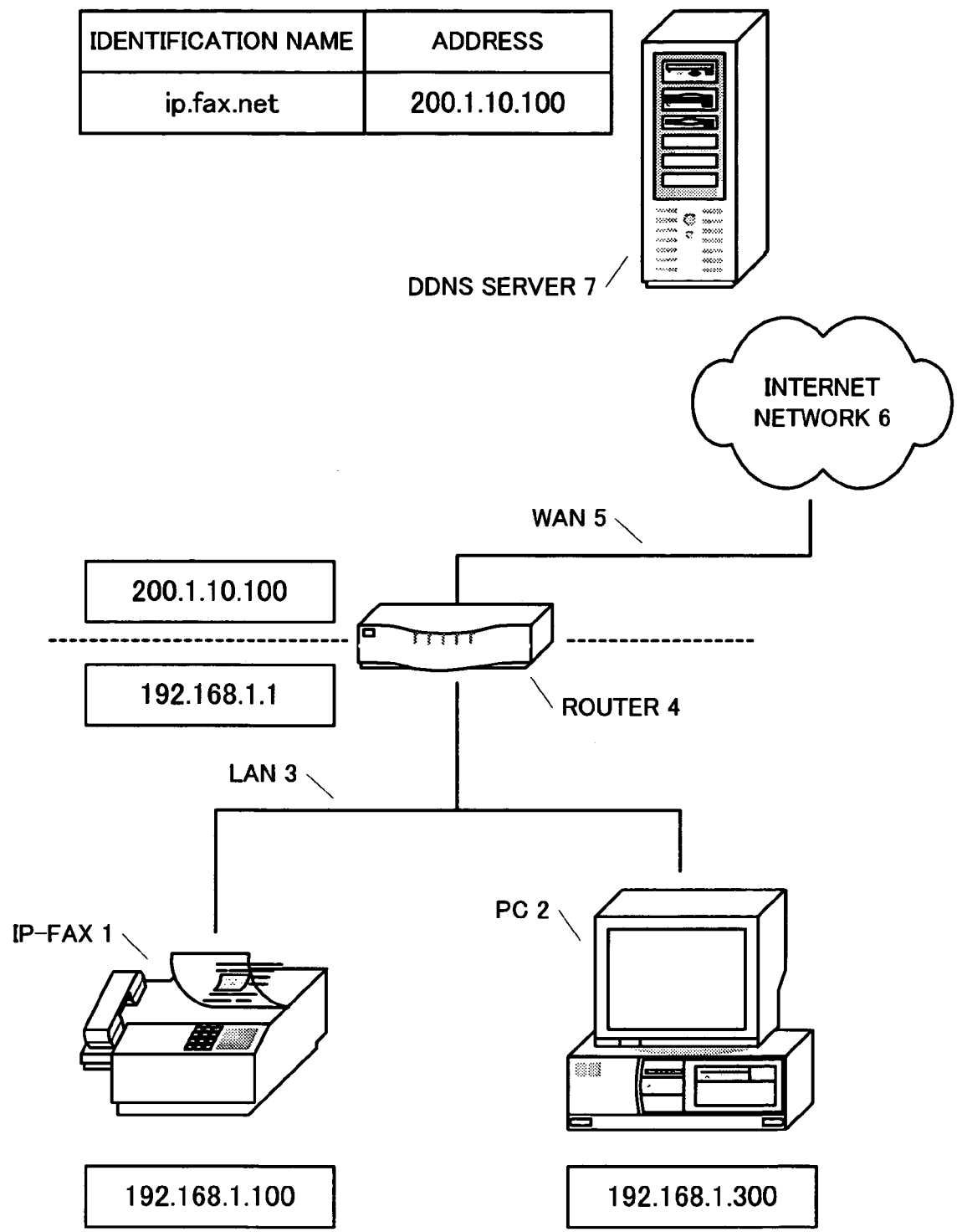
FIG. 1 shows an example of a network to which a facsimile machine is connected according to an embodiment of the present invention.

An embodiment of the present invention will be described with reference to the drawings wherein like numerals refer to like parts throughout. FIG. 1 shows an example of a network when a facsimile machine according to an embodiment of the present invention is connected to the Internet. As shown in FIG. 1, an IP-FAX 1 and a PC 2 or the like are connected to a router 4 via a Local Area Network (LAN) 3. The router 4 is connected to an Internet network 6 via a Wide Area Network (WAN) 5. A DDNS server 7 is connected to the Internet network 6.

Figures 2, 3:
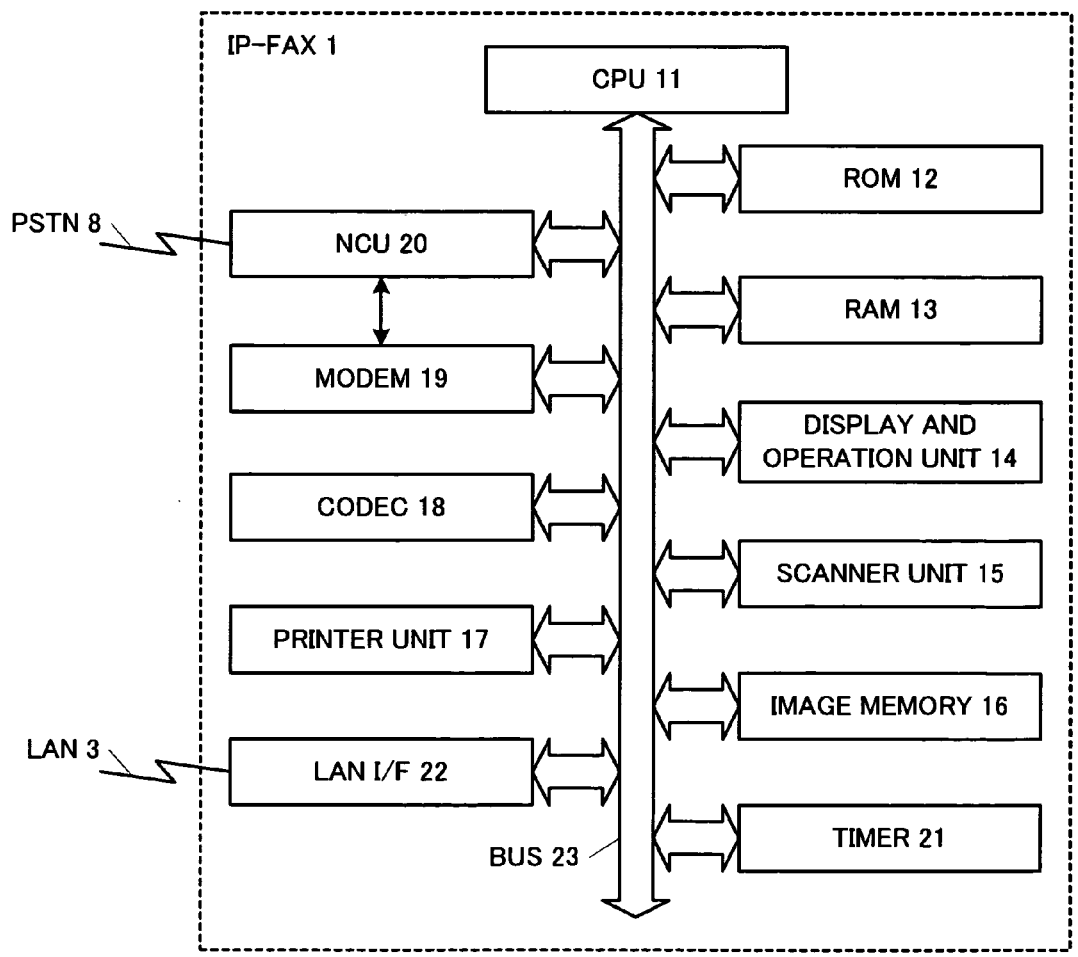
FIG. 2 shows an example of a relationship between a communication port and a private IP address of a transfer destination stored in a router.
FIG. 3 is a block diagram showing a hardware configuration of the facsimile machine according to an embodiment of the present invention.

When establishing a connection with the Internet network 6, an Internet Service Provider (ISP) assigns a global IP address, for example, "200.1.10.100", to the router 4. The router 4 possesses a private IP address "192.168.1.1". A communication port and a private IP address of a transfer destination are stored in the router 4 by being associated one with another as shown in FIG. 2. For example, a private IP address "192.168.1.100" is assigned to the IP-FAX1, and a private IP address "192.168.1.300" is assigned to the PC 2. Furthermore, a private IP address and a global IP address of the router 4, and a server address and account information (for example, a user ID and a password) of the DDNS server 7 are registered in the IP-FAX 1.

As shown in the block diagram of FIG. 3, the IP-FAX 1 includes a Central Processing Unit (CPU) 11, a Read Only Memory (ROM) 12, a Random Access Memory (RAM) 13, a display and operation unit 14, a scanner unit 15, an image memory 16, a printer unit 17, a Coder-Decoder (CODEC) 18, a Modulator-Demodulator (MODEM) 19, a Network Control Unit (NCU) 20, a timer 21 and a LAN InterFace (I/F) 22. Each of the units is connected via a bus 23.

Figures 4, 5, 6:
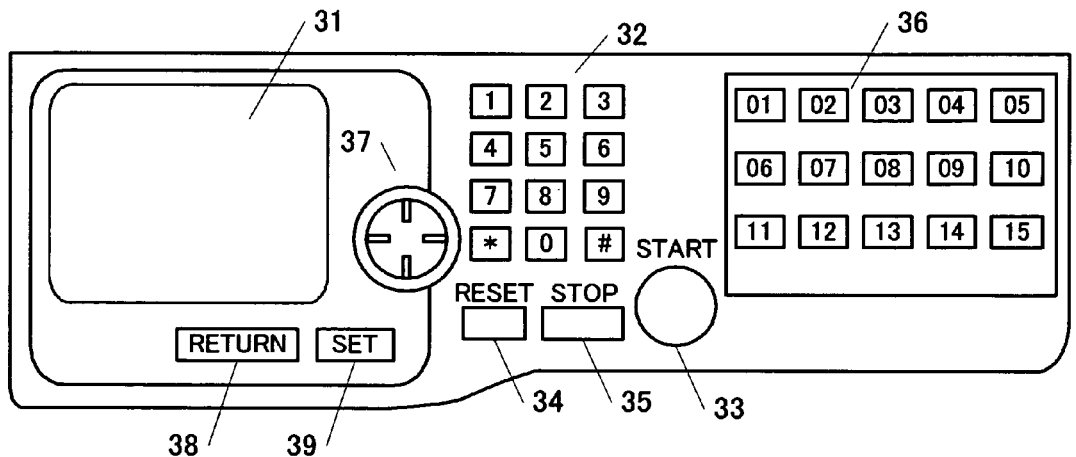
FIG. 4 shows an example of an address and account information of a DDNS server and a domain name of the facsimile machine, which are stored in a Random Access Memory (RAM).
FIG. 5 shows an example of a panel of a display and operation unit.
FIG. 6 shows an example of a relationship between a communication port and a communication type set in the facsimile machine.

The CPU 11 controls each of hardware components of the IP-FAX 1 via the bus 23. The CPU 11 executes various programs in accordance with a program stored in the ROM 12. The ROM 12 previously stores various programs and operation messages necessary for an operation of the IP-FAX 1. The RAM 13 is formed of a Static Random Access Memory (SRAM) or the like. The RAM 13 stores temporary data, which is generated when a program is executed. In addition, the RAM 13 stores a private IP address of the router 4, a global IP address acquired when the router 4 establishes a connection with a communication network, and an address (for example, "ddns.server1") of the DDNS server 7, account information such as a user ID and a password of the DDNS server 7, and a domain name (for example, "ip.fax.net") of the IP-FAX 1, as shown in FIG. 4.

The display and operation unit 14 includes a display unit for displaying an operation status of the IP-FAX 1 and an operation screen of various functions, and a plurality of keys for operating the IP-FAX 1. As shown in FIG. 5, the display and operation unit 14 includes a Liquid Crystal Display (LCD) 31, which constitutes a display unit, and a plurality of operation keys. A touch screen is disposed on the LCD 31. By pressing an item displayed on the LCD 31, a corresponding item can be selected or a function of the corresponding item can be executed. As the operation keys, various keys such as a ten-key numeric pad 32, a start key 33, a reset key 34, a stop key 35, a plurality of one-touch dial keys 36, a cursor key 37, a return key 38 and a set key 39 are provided. Further, a part or all of the operation keys may be substituted by the LCD 31.

The scanner unit 15 includes an Automatic Document Feeder (ADF) and a Flat Bed Scanner (FBS). The scanner unit 15 is a scanner using a Charge-Coupled Device (CCD) or the like. The scanner unit 15 scans an original document, and outputs bit image data converted in a bi-level of black and white. The image memory 16 is formed of a Dynamic Random Access Memory (DRAM), a Synchronous DRAM (SDRAM) or the like. The image memory 16 stores image data to be transmitted, received image data, or image data scanned by the scanner unit 15. The printer unit 17 includes an electrophotographic printer device or the like. The printer unit 17 prints out scanned image data or received image data.

The CODEC 18 encodes and decoded image data in accordance with a prescribed protocol. For transmitting image data of the scanned original document, the CODEC 18 encodes the image data by the Modified Huffman (MH), the Modified READ (MR) or the Modified Modified READ (MMR) scheme. The CODEC 18 decodes image data Received from a remote device. The CODEC 18 also encodes and decodes image data in accordance with the Tagged Image File Format (TIFF), which is an image format generally used as a file that can be attached to electronic mail.

The MODEM 19 is connected to the bus 23. The MODEM 19 includes a function as a fax modem, which can carry out facsimile communication. The MODEM 19 is connected to the NCU 20, which is also connected to the bus 23 in the same manner. The NCU 20 is hardware for carrying out an operation to make and break an analog circuit. According to necessity, the NCU 20 connects the MODEM 19 to a Public Switched Telephone Network (PSTN) 8. The timer 21 clocks time.

The LAN I/F 22 is connected to the LAN 3. The LAN I/F 22 receives a signal from the Internet network 6 via the router 4, and transmits a signal or data to the LAN 3. The LAN I/F 22 executes an interface processing such as a signal conversion and a protocol conversion.

Further, a function for setting and changing a communication port is accomplished by the CPU 11, the ROM 12, the RAM 13 and the display and operation unit 14. A function for changing a port transfer setting of a router and a function for acquiring port information used by the router are accomplished by the CPU 11, the ROM 12, the RAM 13 and the LAN I/F 22. A function for notifying that the communication port cannot be used is accomplished by the CPU 11, the ROM 12, the RAM 13, the display and operation unit 14 and the printer unit 17.

A function for automatically deciding the communication port is accomplished by the CPU 11, the ROM 12 and the RAM 13. A function for notifying information of the decided communication port is accomplished by the CPU 11, the ROM 12, the RAM 13 and the display and operation unit 14. A function for registering and a function for acquiring registration information are accomplished by the CPU 11, the ROM 12, the RAM 13 and the LAN I/F 22. An operation of either one of the functions is executed by a program stored in the ROM 12.

The IP-FAX 1 has the above-described configuration. At Group 3 (G3) facsimile transmission, an image of an original document is scanned by the scanner unit 15, and the image data is compressed by the CODEC 18 and stored into the image memory 16. The compressed image data is retrieved from the image memory 16 and modulated by the MODEM 19. Then, the image data is transmitted from the NCU 20 via the PSTN 8 to a destination. At facsimile reception, the received image data is demodulated by the MODEM 19 and stored into the image memory 16. Then, the compressed image data is decoded by the CODEC 18 and printed out from the printer unit 17.

When carrying out electronic mail transmission, the CPU 11 controls to convert the image data stored in the image memory 16 into a file format that can be attached to electronic mail (for example, a TIFF file) by the CODEC 18, and creates an attached file for electronic mail. The CPU 11 carries out the electronic mail transmission by transmitting the electronic mail attached with the created attached file to a mail address included in destination information via the LAN I/F 22.

Meanwhile, as shown in FIG. 6, in the IP-FAX 1, a communication port "8000" is set by being associated with a communication type "HTTP", a communication port "2500" is set by being associated with a communication type "SMTP" and a communication port "6000" is set by being associated with a communication type "IP-FAX". Such a port number is set when the IP-FAX 1 establishes a connection with a private network. Alternatively, when changing a port number, the IP-FAX 1 automatically carries out a port transfer setting of the router 4. Referring to the flowchart of FIG. 7, a description will be made of an operation of the IP-FAX 1 when carrying out the port transfer setting.

Figure 7:
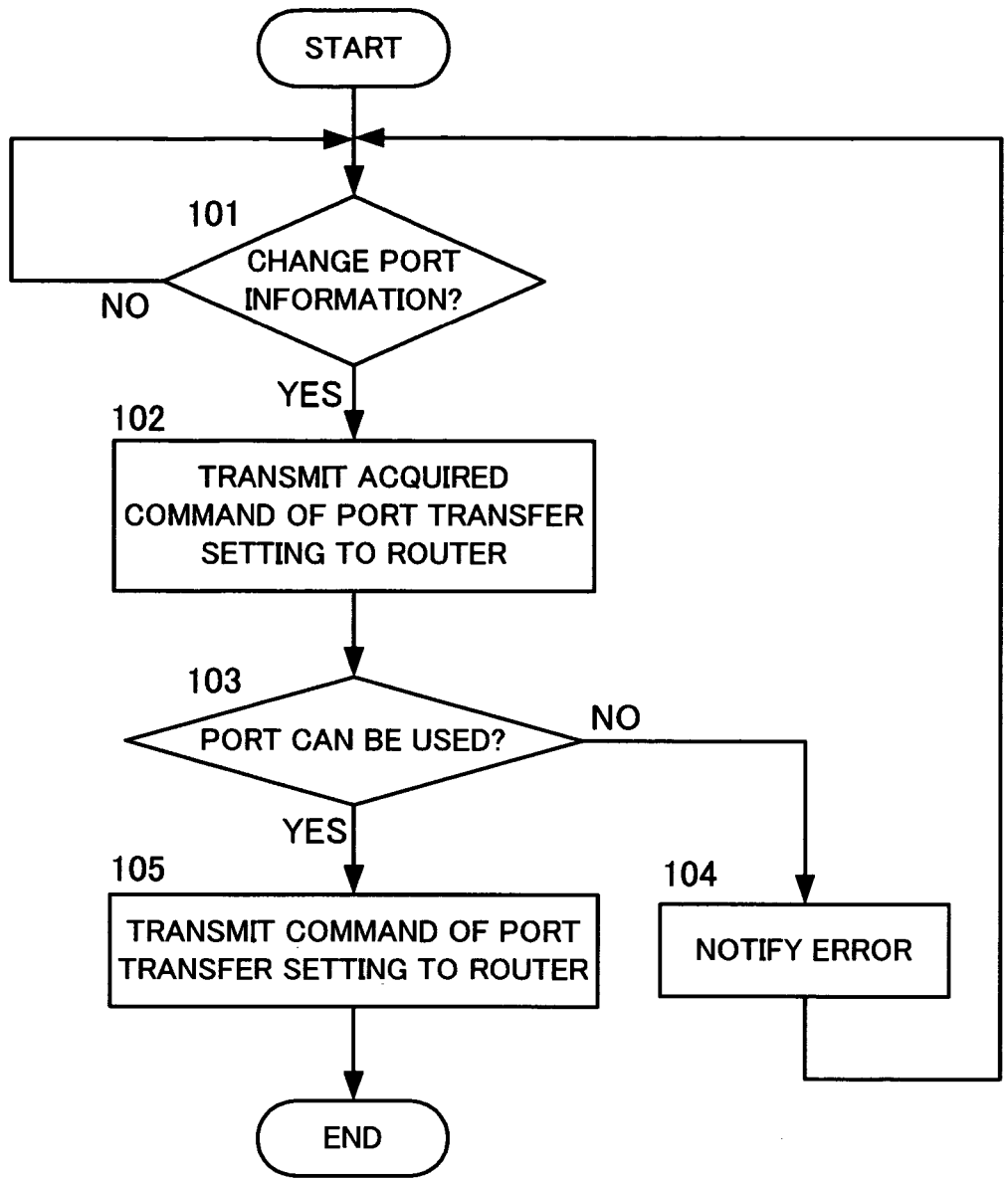
FIG. 7 is a flowchart showing an operation of the facsimile machine when setting and changing a port number.

The CPU 11 of the IP-FAX 1 executes a port setting and changing program shown in the flowchart of FIG. 7 at all times. When the port setting and changing program is started, first, the CPU 11 determines whether or not port information has been changed (step 101). When the port information has not been changed, the process returns to step 101. Meanwhile, when the user changes a port setting from the touch screen or the like of the LCD 31 of the display and operation unit 14, the CPU 11 transmits an acquired command of information relating to the port transfer setting to a private address of the router 4 stored in the RAM 13 (step 102).

Accordingly, port transfer setting information for accessing an internal terminal from an external terminal via the router 4 is returned from the router 4. By comparing the port transfer setting information and a port changed by the user, the CPU 11 determines whether or not the port changed by the user can be used (step 103). When the port setting changed by the user is already used by the router 4 and the port cannot be used, the CPU 11 notifies an error to the user by displaying on the LCD 31 that the port setting set by the user cannot be used or by printing out a list from the printer unit 17 (step 104).

When the CPU 11 determines at step 103 that the port changed by the user can be used, the CPU 11 transmits a command of the port transfer setting to the router 4 (step 105) and ends the program. Accordingly, the port transfer setting of the router 4 is updated automatically by the port setting changed by the user.

In the above-described embodiment, a determination as to whether or not the port changed by the user can be used is made in accordance with the port transfer setting information from the router 4. However, prior to the change of the port made by the user, the IP-FAX 1 can acquire the port transfer setting information of the router 4, and the acquired port transfer setting information can be printed out from the printer unit 17. Accordingly, the user can confirm a current port transfer setting of the router 4 and select an available port to change the port.

The IP-FAX 1 can automatically carry out the port setting in accordance with the port transfer setting information of the router 4 acquired by the IP-FAX 1. Next, referring to the flowchart of FIG. 8, a description will be made of an operation of the IP-FAX 1 when carrying out the port setting fully automatically.

Figure 8:
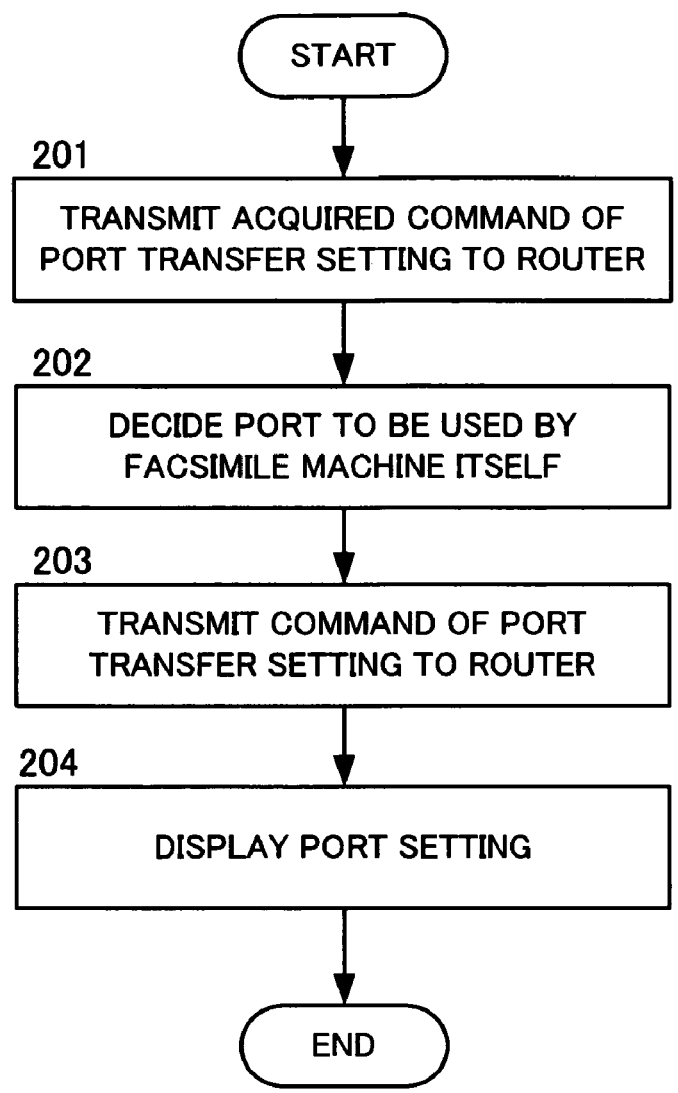
FIG. 8 is a flowchart showing an operation of the facsimile machine when carrying out a port setting fully automatically.

For example, when the user instructs an automatic setting of the port from the touch screen of the LCD 31, the CPU 11 of the IP-FAX 1 starts a port automatic setting program shown in the flowchart of FIG. 8. First, the CPU 11 transmits an acquired command of the port transfer setting information to the private address of the router 4 stored in the RAM 13 (step 201). Accordingly, since the port transfer setting information is returned from the router 4, the CPU 11 selects an available port in accordance with the port transfer setting information of the router 4 to decide the port to be used by the IP-FAX 1 itself (step 202).

Next, the CPU 11 transmits a command of a port transfer setting including the decided port information to the router 4, and sets the decided port information in the router 4 (step 203). Then, the CPU 11 displays the decided port setting on the LCD 31 (step 204).

As described above, by instructing an automatic setting of the port, the port to be used by the IP-FAX 1 itself is decided automatically by the IP-FAX 1, and the port transfer setting of the router is updated. Then, the decided port setting is displayed on the LCD 31. As a result, the user can confirm the port information set automatically. In this case, a port setting is required to be carried out for each function of the IP-FAX 1. However, a function to be used by the user can be designated, and a port setting can be carried out so that only the designated function can be used.

Figure 9:
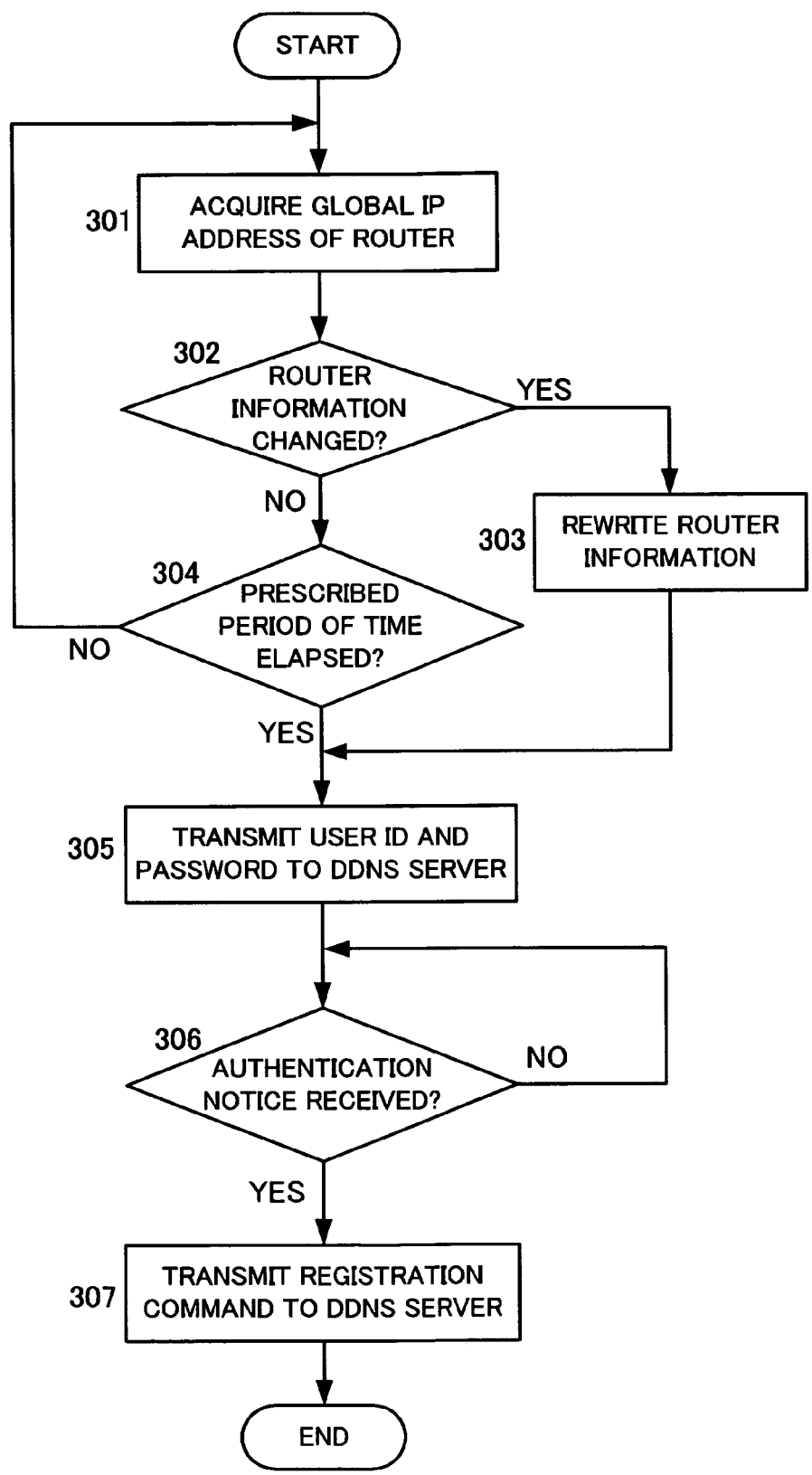
FIG. 9 is a flowchart showing an operation of the facsimile machine when updating address information for a DDNS server.

Next, referring to the flowchart of FIG. 9, a description will be made of an operation of the IP-FAX 1 when updating address information for the DDNS server 7. The CPU 11 of the IP-FAX 1 executes an address information updating program shown in the flowchart of FIG. 9 at all times. The CPU 11 acquires a global IP address of the router 4 by periodically transmitting an IP address acquiring command of the WAN 5 to the private address of the router 4 stored in the RAM 13 (step 301).

Next, the CPU 11 determines whether or not the acquired address has been changed from the global IP address stored in the RAM 13 (step 302). When the acquired address differs from the IP address stored in the RAM 13, the CPU 11 rewrites the global IP address stored in the RAM 13 into the acquired address (step 303).

Meanwhile, when the acquired address is the same as the global IP address stored in the RAM 13, the CPU 11 determines whether or not a prescribed period of time has elapsed from when the address information was updated in the DDNS server 7 in accordance with clocking information of the timer 21 (step 304). When a prescribed period of time has not elapsed yet, the process returns to step 301.

When a determination is made at step 304 that a prescribed period of time has elapsed, or when rewriting of the router information at step 303 has been completed, the CPU 11 retrieves and transmits the user ID and the password stored in the RAM 13 to the address of the DDNS server 7 stored in the RAM 13 (step 305). Next, the CPU 11 determines whether or not an authentication notice has been received from the DDNS server 7 (step 306). When the authentication notice has been received, the CPU 11 transmits a registration command including a domain name of the IP-FAX 1 to the DDNS server 7 (step 307). Further, when necessary, the global IP address of the router 4 can be transmitted to the DDNS server 7 as the registration information along with the domain name of the IP-FAX 1.

Accordingly, when the global IP address of the router 4 has been changed, the registration information of the DDNS server 7 is immediately updated automatically. When a prescribed period of time elapses from the registration of the address information with the DDNS server 7, the registration information of the DDNS server 7 is updated automatically. Therefore, the information of the DDNS server can be updated without requiring an exclusive router.

In the above-described embodiment, a description is made of an example in which an Internet node is a router. However, if a device is assigned with a global IP address dynamically, such a device may be adopted as the Internet node. A MODEM for a telephone line, a MODEM for an Asymmetric Digital Subscriber Line (ADSL), a bridge and a MODEM for a Community Antenna TeleVision (CATV) or the like having the same function as the router may be adopted as the Internet node. In the above-described embodiment, the display and operation unit of the IP-FAX is used for displaying the setting and the change of the port, the error and decided port information. However, the change of the port and the error or the like may be displayed on a display of the PC 2 or the like connected to the LAN 3.

While the description above refers to particular embodiments of the present invention, it will be understood that many modifications maybe made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A facsimile machine comprising:
    means for storing address information and account information of a prescribed remote server and a domain name of the facsimile machine itself;
    means for registering registration information including the domain name with the remote server;
    means for acquiring global address information of a router; and
    means for clocking, wherein when the means for acquiring periodically acquires the global address information of the router under a prescribed interval and the acquired global address information has been changed from information acquired last time, after the registration information is updated immediately, the means for clocking clocks a period of time from when the registration information is registered with the remote server; wherein when a prescribed period of time elapses from registration, the registration information is updated.

2. The facsimile machine according to claim 1, further comprising means for transmitting account information of the router to the remote server.

3. The facsimile machine according to claim 2, further comprising means for receiving an authentication notice from the remote server and carrying out a procedure of an authentication.

4. The facsimile machine according to claim 3, further comprising means for transmitting a command for registering the registration information to the remote server when authenticated by the remote server.

5. The facsimile machine according to claim 1, further comprising means for transmitting registration information of the router to the remote server.

* * * * *

UNITED STATES PATENT AND TRADEMARK OFFICE
CERTIFICATE OF CORRECTION

| | | |
|---|---|---|
| PATENT NO. | : 7,616,652 B2 | Page 1 of 1 |
| APPLICATION NO. | : 11/216342 | |
| DATED | : November 10, 2009 | |
| INVENTOR(S) | : Yoshifumi Tanimoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Nineteenth Day of October, 2010

David J. Kappos
*Director of the United States Patent and Trademark Office*